United States Patent [19]

Bishop et al.

[11] Patent Number: 4,472,019

[45] Date of Patent: Sep. 18, 1984

[54] TOPCOATS FOR BUFFER-COATED OPTICAL FIBER USING URETHANE ACRYLATE AND EPOXY ACRYLATE AND VINYL MONOMER

[75] Inventors: Timothy E. Bishop, Arlington Heights; George Pasternack, Lincolnshire; Orvid R. Cutler, Rolling Meadows, all of Ill.

[73] Assignee: DeSoto, Inc., Des Plaines, Ill.

[21] Appl. No.: 453,972

[22] Filed: Dec. 28, 1982

[51] Int. Cl.³ ................................. G02B 5/14
[52] U.S. Cl. ............................. 350/96.3; 204/159.19; 204/159.11; 350/96.23; 525/920; 525/922; 526/301; 526/302
[58] Field of Search ...................... 204/159.19, 159.23; 350/96.23

[56] References Cited

U.S. PATENT DOCUMENTS

| | | | |
|---|---|---|---|
| 3,709,866 | 1/1973 | Waller | 204/159.23 |
| 4,097,439 | 6/1978 | Darling | 525/445 |
| 4,165,265 | 8/1979 | Nakabayashi et al. | 204/159.19 |
| 4,319,811 | 3/1982 | Tu et al. | 428/442 |

Primary Examiner—John C. Bleutge
Assistant Examiner—A. H. Koeckert
Attorney, Agent, or Firm—Dressler, Goldsmith, Shore, Sutker & Milnamow, Ltd.

[57] ABSTRACT

Radiation-curable coating compositions adapted for application to buffer-coated optical fibers are disclosed. These are intended to apply an adherent topcoat having greater toughness and greater hardness than the buffer coating. The new compositions comprise: (1) from 25% to 70% of diethylenic-terminated polyurethane, which may include urea linkages, the polyurethane being based on a diisocyanate having an average molecular weight of from 400 to 5000; (2) from 5% to 40% of a diethylenically unsaturated ester of a diglycidyl ether of a bisphenol, said ether having a molecular weight up to about 1000; and (3) from 5% to 30% of liquid radiation-curable monoethylenically unsaturated monomer having a $T_g$ above about 55° C., especially N-vinyl pyrrolidone. Ultraviolet cures using acrylates as the ethylenic group are preferred.

16 Claims, No Drawings

TOPCOATS FOR BUFFER-COATED OPTICAL FIBER USING URETHANE ACRYLATE AND EPOXY ACRYLATE AND VINYL MONOMER

DESCRIPTION

1. Technical Field

This invention relates to the coating of optical fibers using radiation-curable coating compositions, and more particularly to the provision of ultraviolet curable topcoating compositions which are used to protect the primary or buffer coating which is applied to protect the glass surface of the optical fibers. In this description, the primary coating is also referred to as a buffer coating because it intervenes between the glass fiber and the topcoating. Since the buffer coating is also referred to as a primary coating, the topcoating may also be termed a secondary coating.

2. Background Art

Optical glass fibers are acquiring increasing importance for communication purposes, but in order to use the glass fibers it is necessary to protect the glass surface from moisture and from abrasion. This is done by coating the glass fiber immediately following its formation. Solvent solution coatings and extrusions have been applied, but these present problems which have been solved to a considerable extent by the employment of ultraviolet light-curable coating compositions.

One problem presented by the use of coatings which are adhered to the glass surface of the optical fiber is caused by the difference in response to change in temperature between the glass and the coating which contributes to microbending of the fibers, especially when very low temperatures are encountered. To minimize this problem, coatings possessing a very low modulus are selected to provide the primary coating, and ultraviolet curable primary coating compositions have been developed which possess this low modulus. These are more fully described in certain commonly owned applications, namely: the application of Robert E. Ansel Ser. No. 170,148 filed July 18, 1980 and the application of Robert E. Ansel, O. Ray Cutler and Elias P. Moscovis Ser. No. 398,161 filed July 19, 1982.

In order to provide the desired low modulus in the primary coatings, one must sacrifice desired hardness and toughness in the coating which contacts the glass. To increase the hardness and toughness of the exposed coating surface, it is desired to apply a secondary coating on top of the primary coating, and the high speed application and cure of such secondary coatings and the resulting doubly coated optical fibers is the subject of this invention.

DISCLOSURE OF INVENTION

In accordance with this invention, a radiation-curable topcoat or secondary coating composition is provided in which: (1) from 25% to 70% of the coating composition is constituted by a diethylenic-terminated polyurethane, which may contain urea groups, said polyurethane being based on a diisocyanate having an average molecular weight of from 400 to 5000, preferably from 800 to 2500; (2) from 5% to 40% of the coating composition is constituted by a diethylenically unsaturated ester of a diglycidyl ether of a bisphenol, the ether having a molecular weight up to about 1000, preferably below 400 (bisphenol A is preferred); and (3) from 5% to 30% of the coating composition is constituted by radiation-curable monoethylenically unsaturated liquid monomer having a $T_g$ above about 55° C. The preferred ethylenic group enabling ultraviolet cure is the acrylate group.

This combination of radiation-curable components provides great physical toughness in combination with considerable hardness in an adherent coating, and the high $T_g$ liquid monomer reduces the viscosity while increasing the speed of radiation cure.

$T_g$ denotes the glass transition temperature of a homopolymer made from the monomer, and the high $T_g$ monomers used herein are illustrated by dimethyl acrylamide, N-vinyl pyrrolidone, isobornyl acrylate and dicylopentenyl acrylate. N-vinyl pyrrolidone is especially preferred because it is far better at lowering viscosity while simultaneously increasing the speed of radiation cure.

While it is known that N-vinyl pyrrolidone, and to a lesser extent the other monomers listed, are capable of reducing the viscosity and increasing the cure speed of radiation curable coatings, it was not known that relatively large amounts of high $T_g$ monomers would increase the hardness of the compositions under consideration while retaining the tough, moderate modulus character of the cured compositions. Thus, N-vinyl pyrrolidone, and to a lesser extent the other listed high $T_g$ monomers, accomplish several commercially important objectives at the same time.

In this specification and the accompanying claims, all proportions are by weight, unless otherwise specified, and acrylates will be used as illustrative.

Referring more particularly to the diacrylate-terminated polyurethanes, these are formed by providing acrylate-functional terminal groups on a diisocyanate-terminated product having a molecular weight in the range of 400 to 5000, preferably 800 to 2500. While several production procedures are available, the diisocyanate-terminated product can be described as the reaction product of an organic diisocyanate with an aliphatic molecule having two isocyanate-reactive hydrogen atoms, as may be provided by the OH, SH, or NH$_2$ groups. These diisocyanate-terminated reaction products include from 2 to 10 urethane and/or urea groups, preferably from 2 to 4 such groups.

The aliphatic groups may be a simple alkane diol, such as 1,6-hexane diol, but it is preferred that the aliphatic groups be selected from polyether, polyester and polyether-ester groups. Polyether groups are illustrated by tetramethylene glycol, polyester groups by the ester reaction product of two moles of ethylene glycol with one mole of adipic acid, and polyether-ester groups by the ester reaction product of two moles of diethylene glycol with one mole of adipic acid.

Appropriate diisocyanates may be aliphatic or aromatic, such as isophorone diisocyanate, 2,4-toluene diisocyanate and its isomers, and hexamethylene diisocyanate. Toluene diisocyanates are preferred, and this class of materials is well known in the art.

Diacrylate termination of the diisocyanates may be accomplished in various ways. Thus, one can form the higher molecular weight diisocyanates first, and then react with 2 molar proportions of hydroxy alkyl acrylate to thereby place one such unsaturated group on each available isocyanate group. These hydroxy alkyl acrylates may have from 2 to 6 carbon atoms in the alkyl group and are illustrated by hydroxy ethyl acrylate and by hydroxy propyl acrylate. Correspondingly, one can first react the hydroxy alkyl acrylate with one molar proportion of a low molecular weight diisocyanate and then react two molar proportions of the unsaturated monoisocyanate so-formed with one mole of a dihydroxy compound which provides the desired molecular weight. Both procedures are known to the art.

Urea groups may be incorporated into the polyurethane by reacting one mole of the previously described diisocyanates with one mole of hydroxy ethyl acrylate to provide an unsaturated urethane product containing a single unreacted isocyanate group. By then reacting two moles of this monoisocyanate with one mole of a diamine, such as butylene diamine, we obtain a polyurea polyurethane having two terminal acrylate groups. Urea-containing diacrylates are further illustrated in U.S. Pat. No. 4,097,439.

The diglycidyl ethers of a bisphenol which are employed preferably have a 1,2-epoxy equivalency of about 2.0, but anything in excess of about 1.4 is useful herein. This merely means that the desired diglycidyl ethers are in admixture with monoglycidyl ethers which reduces the epoxy equivalency. These diglycidyl ethers, when of low molecular weight, can be used to form diacrylate (by adduction to form hydroxy acrylates). These, when used in combination with the diacrylate-terminated polyurethanes, provide the moderate modulus coatings which have good hardness and toughness, as previously described.

The term "bisphenol" denotes a pair of phenolic groups linked together through an intervening divalent structure which is usually an alkylene group. When the phenolic OH groups on each of the phenol portions of the bisphenol are in the para position, and using 2,2-propylene as the intervening divalent structure, the product is available in commerce where it is well known as bisphenol A.

Since ultraviolet light is preferred, acrylic unsaturation is best, but since the radiation character can vary, so can the specific character of the unsaturation. Other useful ethylenic unsaturations are illustrated by methacrylic, itaconic, crotonic, allylic, vinylic, etc. These can be provided (using methacrylic unsaturation as illustrative) by reaction of isocyanate functionality with 2-hydroxyethyl methacrylate. Allylic unsaturation may be introduced using allyl alcohol in place of hydroxyethyl acrylate. Vinylic unsaturation may be introduced using hydroxy butyl vinyl ether in place of hydroxyethyl acrylate.

Accordingly, while acrylate unsaturation has been referred to previously as illustrative and preferred, other radiation curable monoethylenically unsaturated groups may be used in its place in the manner illustrated for methacrylic unsaturation.

The radiation which effects cure will vary with the photoinitiator used. Even visible light may be employed using appropriate photoinitiators. These are illustrated by camphor quinone and coumarin which are used together with a tertiary amine, such as triethyl amine. Diphenylbenzoylphosphine oxide is useful in and near the ultraviolet range.

When ultraviolet light is employed, the coating composition preferably contains a photoinitiator which is usually a ketonic photoinitiator, such as about 3% of diethoxy acetophenone. Other photoinitiators are also known, such as acetophenone, benzophenone, m-chloro-acetophenone, propiophenone, thioxanthone, benzoin, benzil, anthraquinone, and the like. The photoinitiators may be used singly or in mixtures and are present in amounts up to about 10% of the coating composition. Various amines, such as diethyl amine, may also be present, but are not needed herein.

The radiation-curable coatings which are provided in accordance with this invention may be used for adhesives or for the coating of flexible floor tiles, but are very unique when applied as topcoats for buffer-coated optical fibers, as previously explained. Regardless of the use to which the coating compositions of this invention are put, and regardless of the radiation energy used to cure the same, they possess the same combination of superior hardness and toughness which allows them to serve as topcoats on optical fibers.

The coatings of this invention, when cured, possess a modulus which is generally in the range of 100,000 to 200,000 psi at room temperature. This is far too hard to serve as a coating which is directly in contact with the glass surface of the fibers. The buffer coatings which are used have a modulus measured at room temperature which is less than about 15,000 psi.

Most radiation-cured coatings have a much higher modulus and are too brittle to be useful herein. When these brittle coatings are modified to make them less brittle, they possess little strength. The combination of hardness and toughness with moderate modulus provided herein adapts the instant coatings for specialized purposes, as previously described.

The invention is illustrated by a series of coating compositions formulated by simple mixing of the components tabulated below. The mixture is warmed to about 55° C. for 1 hour to dissolve all of the components.

TABLE 1

| Component | Ex. 1 (control) | Ex. 2 (control) | Ex. 3 | Ex. 4 |
|---|---|---|---|---|
| 1 | 53.6 | 38.3 | 62.0 | 50.0 |
| 2 | 17.3 | 29.0 | 14.2 | 24.6 |
| 3 | 11.5 | 19.3 | — | — |
| 4 | 4.6 | 3.4 | — | — |
| 5 | 8.7 | 6.4 | 4.0 | 2.0 |
| 6 | 0.4 | 0.7 | 1.0 | 2.5 |
| 7 | 0.01 | 0.01 | 0.01 | 0.01 |
| 8 | 2.0 | 1.5 | 2.0 | 0.5 |
| 9 | — | 0.01 | — | — |
| 10 | 0.7 | 0.6 | — | — |
| 11 | — | — | 16.0 | 20.0 |

In the above tabulation, component 1 is an adduct of two moles of 2-hydroxyethyl acrylate with one mole of a diisocyanate-terminated polyurethane made by adducting a mixture of toluene diisocyanates (80% 2,4-isomer and 20% 2,6 isomer) with a polytetramethylene glycol formed by polymerizing tetrahydrofuran to form a polyether diol having a molecular weight of 600–800. The polyurethane formed by acrylating this diisocyanate has a molecular weight of about 1900 and includes an average of 5–6 urethane groups per molecule. The du Pont product Adiprene L-200 may be used.

Component 2 is a diacrylate ester of a diglycidyl ether of bisphenol A, the ether having an average molecular weight of about 390. Shell product DRH 370 may be used as component 2.

Component 3 is tetraethylene glycol diacrylate.

Component 4 is triethylene glycol diacrylate.

Component 5 is trimethylol propane triacrylate.

Component 6 is benzil dimethyl ketal which serves as a photoinitiator. Irgacure 651 of Ciba-Geigy may be used as component 6.

Component 7 is phenothiazine.

Component 8 is benzophenone.

Component 9 is 2-hydroxy-4-n-octoxybenzophenone. This compound serves as a light stabilizer.

Component 10 is diethyl amine.

Component 11 is N-vinyl pyrrolidone

Small amounts of auxiliary agents are useful in the above examples. One function served by such agents is to provide surface lubricity, a nonessential function. In all of the examples presented herein, surface lubricity is enhanced using silicone oils in small amounts. Examples 1 and 3 used 0.2% of Dow Corning fluid DC 57 and 0.6% of Dow Corning fluid DC 190. In examples 2 and 4, 0.07% of DC 57 was used with 0.13% of DC 190. Example 4 also used 0.2% of N-beta-(N-vinylbenzylamino) ethyl-gamma-aminopropyl trimethoxy silane. monohydrogen chloride. None of these additions is regarded to be important.

The coating compositions in the Table 1 were used as a topcoat on buffer-coated glass fiber. The optical glass fiber which was buffer coated had a diameter of about 125 micron and it was buffer-coated to a thickness of 125 micron using the low modulus buffer coating described in application of Ansel Ser. No. 170,148 referred to previously. More particularly, the buffer coating was made by reacting 4 moles of 4,4'-methylene bis(cyclohexyl isocyanate) with 2 moles of polyoxypropylene glycol of molecular weight 1000 and then reacting with 2 moles of 2-hydroxyethyl acrylate and then with one mole of polyoxypropylene diamine of molecular weight 230 in the presence of 3.4 moles of N-vinyl pyrrolidone and 917 moles of phenoxyethyl acrylate. This mixture, with 3% by weight of diethoxy acetophenone, is ultraviolet cured on freshly formed optical fiber.

By applying the topcoats tabulated previously to the buffer-coated glass fiber in a thickness of 125 microns and then passing the wet-coated fiber through two tandemly arranged 10 inch medium pressure mercury vapor lamps (300 watts) at a velocity of 1.5 meters per second, the following results are obtained. The properties reported were measured on a free film having a thickness of about 75 microns.

TABLE 2

| Property | Ex. 1 | Ex. 2 | Ex. 3 | Ex. 4 |
|---|---|---|---|---|
| Viscosity at application (cps. at 25° C.) | 8,600 | 6,000 | 6,500 | 4,500 |
| Cure speed (Ex. 1 is assigned a rating of 1) | 1 | 1 | 1.2 | 1.2 |
| Tensile strength (psi) | 2,900 | ,500 | 4,300 | 6,000 |
| % elongation | 17 | 12 | 24 | 13 |
| Modulus at 2.5% elongation | 67,000 | 100,000 | 100,000 | 140,000 |
| Rupture strength (in.lb./in$^3$) | 800 | 800 | 2,000 | 900 |
| Hardness Shore D (initial) | 55 | 56 | 63 | 68 |
| Tukon hardness | 4.0 | 5.8 | 6.9 | 10.0 |
| Tg (°C.) | 42 | 48 | 58 | 63 |

It will be appreciated from Table 1 that Examples 1 and 2 are presented herein as a control illustrating prior practice.

As can be seen, while the results of the two control experiments are satisfactory, Examples 3 and 4 are superior, and the result is surprising. This is because the viscosities in Examples 3 and 4 are lower than in Examples 1 and 2, respectively, and hence more favorable. At the same time, the cure is faster and the coefficient of thermal expansion below the glass transition temperature is lower, so less strain is placed on the glass fiber at low temperature.

What is claimed is:

1. A radiation-curable coating composition adapted to be applied to buffer-coated optical fibers to apply an adherent topcoat having greater toughness and greater hardness than said buffer coating comprising: (1) from 25% to 70% of the coating composition of diethylenic-terminated polyurethane which may include urea linkages, said polyurethane being based on a diisocyanate having an average molecular weight of from 400 to 5000; (2) from 5% to 40% of the coating composition of a diethylenically unsaturated ester of a diglycidyl ether of a bisphenol, said ether having a molecular weight up to about 1000, and (3) from 5% to 30% of the coating composition of liquid radiation curable monoethylenically unsaturated monomer having a $T_g$ above about 55° C.

2. A coating composition as recited in claim 1 in which said diglycidyl ether is a diglycidyl ether of bisphenol A, said diglycidyl ether having an average molecular weight less than 400.

3. A coating composition as recited in claim 1 in which said diethylenic-terminated polyurethane has an average molecular weight in the range of 800 to 2500.

4. A coating composition as recited in claim 1 in which from 5% to 30% of the coating composition is constituted by liquid monomer selected from the group of dimethyl acrylamide, N-vinyl pyrrolidone, isobornyl acrylate, and dicylopentenyl acrylate.

5. A coating composition as recited in claim 4 in which said liquid monomer consists essentially of N-vinyl pyrrolidone.

6. A coating composition as recited in claim 1 in which said diglycidyl ether of a bisphenol has a 1,2-epoxy equivalency of at least 1.4.

7. A coating composition as recited in claim 1 in which the polyurethanes which are diethylenic-terminated contain an organic diisocyanate which is the reaction product of an organic diisocyanate with an aliphatic molecule having two isocyanate-reactive hydrogen atoms, said reaction product including from 2 to 10 urethane and/or urea groups.

8. A coating composition as recited in claim 7 in which said aliphatic groups are selected from polyether, polyester and polyether-ester groups.

9. A coating composition as recited in claim 8 in which said diethylenic-terminated polyurethane is obtained from an hydroxyalkyl acrylate in which the alkyl group contains from 2–6 carbon atoms.

10. A coating composition as recited in claim 9 in which said acrylate is hydroxyethyl acrylate.

11. A coating composition as recited in claim 8 in which said polyurethane includes urea groups.

12. An ultraviolet curable coating composition adapted to be applied to buffer-coated optical fibers to apply an adherent topcoat having greater toughness and greater hardness than said buffer coating comprising: (1) from 25% to 70% of the coating composition of diacrylate-terminated polyurethane which may include urea linkages, said polyurethane being based on a diisocyanate having an average molecular weight of from 400 to 5000; (2) from 5% to 40% of the coating composition of a diacrylate of a diglycidyl ether of a bisphenol, said ether having a molecular weight up to about 1000; and (3) from 5% to 30% of the coating composition of liquid radiation-curable monoethylenically unsaturated monomer having a $T_g$ above about 55° C., said composition further including a photoinitiator rendering the composition sensitive to ultraviolet light.

13. A coating composition as recited in claim 12 in which said polyurethane is obtained from an hydroxyalkyl acrylate in which the alkyl group contains from 2 to 6 carbon atoms and the reaction product of a diisocyanate with an aliphatic diol.

14. A coating composition as recited in claim 13 in which hydroxyethyl acrylate is reacted with a diisocyanate which includes repeating groups selected from polyether, polyester and polyether-ester groups.

15. An optical glass fiber prime coated with a coating having a room temperature modulus less than about 15,000 psi overcoated with a radiation-cured coating having greater toughness and greater hardness than said prime coating and comprising; (1) from 25% to 70% of the coating composition of diethylenic-terminated polyurethane which may include urea linkages, said polyurethane being based on a diisocyanate having an average molecular weight of from 400 to 5000; (2) from 5% to 40% of the coating composition of a diethylenically unsaturated ester of a diglycidyl ether of a bisphenol, said ether having a molecular weight up to about 1000, and (3) from 5% to 30% of the coating composition of liquid radiation curable monoethylenically unsaturated monomer having a Tg above about 55° C.

16. An optical glass fiber prime coated with a coating having a room temperature modulus less than about 15,000 psi overcoated with a radiation-cured coating as recited in claim 15 in which said polyurethane is diacrylate-terminated, said diethylenically unsaturated ester is a diacrylate, and said composition further includes a photoinitiator rendering the composition sensitive to ultraviolet light.

* * * * *

UNITED STATES PATENT AND TRADEMARK OFFICE
CERTIFICATE OF CORRECTION

PATENT NO. : 4,472,019
DATED : September 18, 1984
INVENTOR(S) : Timothy E. Bishop et al.

It is certified that error appears in the above—identified patent and that said Letters Patent is hereby corrected as shown below:

Column 5, line 57, insert at the bottom of Table 2:

-- Coefficient of thermal expansion (below $T_g$) --  9   7   5.4   4.2

Signed and Sealed this

Nineteenth Day of February 1985

[SEAL]

Attest:

DONALD J. QUIGG

*Attesting Officer*    *Acting Commissioner of Patents and Trademarks*